United States Patent [19]

Sakata

[11] Patent Number: 4,980,779
[45] Date of Patent: Dec. 25, 1990

[54] INFORMATION SIGNAL RECORDING AND/OR REPRODUCING APPARATUS FOR CORRECTING TIME VARIATIONS

[75] Inventor: Tsuguhide Sakata, Tokyo, Japan

[73] Assignee: Canon Kabushiki Kaisha, Tokyo, Japan

[21] Appl. No.: 232,317

[22] Filed: Aug. 15, 1988

[30] Foreign Application Priority Data

Aug. 20, 1987 [JP] Japan .................................. 62-207813

[51] Int. Cl.⁵ ............................................. H04N 9/89
[52] U.S. Cl. ................................... 358/324; 358/320; 358/330
[58] Field of Search ............... 358/310, 335, 323, 324, 358/330, 325, 909; 360/36.1

[56] References Cited

U.S. PATENT DOCUMENTS 4,809,084 2/1989 Morimoto et al. .................. 358/324

Primary Examiner—Robert L. Richardson
Attorney, Agent, or Firm—Robin, Blecker, Daley & Driscoll

[57] ABSTRACT

An information recording apparatus for correcting the synchronization portion of a luminance signal and the pedestal portion of a chrominance signal and recording the corrected luminance and chrominance signals. An information reproducing apparatus is provided for reading the corrected luminance signal and chrominance signal and producing a luminance and chrominance signal having the time base variations that occur in the signal removed.

29 Claims, 6 Drawing Sheets

FIG.2(a) LUMINANCE SIGNAL

FIG.2(b) COLOR-DIFFERENCE LINE-SEQUENTIAL SIGNAL

FIG.2(c) PEDESTAL GATE PULSE

FIG.2(d) SYNC TIP GATE PULSE fy ± fc MOIRÉ IN COLOR BARS

INFORMATION SIGNAL RECORDING AND/OR REPRODUCING APPARATUS FOR CORRECTING TIME VARIATIONS

BACKGROUND OF THE INVENTION

1. Field of the Invention

This invention relates to an information signal recording and/or reproducing apparatus for recording an information signal on a recording medium or for reproducing an information signal recorded on a recording medium.

2. Description of the Related Art

The kind having a recording part for recording an information signal such as video signal on a recording medium such as a magnetic disc and a reproducing part for reproducing the video signal from the recording medium include, for example, an apparatus called a still video system.

The still video system employs a method called a component recording/reproducing method, wherein a luminance signal and color-difference signals are separated and modulated to different frequency bands respectively. Meanwhile, there is another known system which is arranged to record or reproduce a video signal in the form of a composite signal which includes and has a luminance signal and a chrominance signal multiplexed in an interleaved state. In the case of such a system, a color video signal is recorded on a recording medium such as an optical disc along with a color burst signal which is included in the video signal. As regards a reproducing operation, there has been known a reproducing arrangement, wherein the time base of the reproduced video signal is corrected by utilizing the above stated color burst signal for the purpose of removing the adverse effects of jitters of such parts as a motor, etc. that are used for driving the magnetic disc to rotate.

However, the system first stated above is not arranged to record any reference signal for time base correction. Therefore, it has been difficult to prevent the adverse effects of jitters with the reproduced video signal time base corrected. Meanwhile, in the case of the second system, the time base correction can be accomplished for a color video signal. However, the system is incapable of accurately carrying out time base correction for such signals that do not include a burst signal, such as a black-and-white video signal. Further, a circuit provided for extracting a burst signal inserting signal part at the timing of the fall or rise of a synchronizing (hereinafter referred to as sync) signal generally necessitates use of two monostable multivibrators. This results in a complex arrangement.

SUMMARY OF THE INVENTION

It is a general object of this invention to provide an information signal recording and/or reproducing apparatus which is capable of solving the above stated problems of the prior art.

It is a more specific object of the invention to provide an information signal recording apparatus which is capable of recording an information signal on a recording medium in such a manner that, in reproducing the recorded signal, time base variations occurring in the information signal reproduced from the recording medium can be easily corrected without recourse to any special signal.

Under this object, an information signal recording apparatus arranged, as an embodiment of the invention, to record on a recording medium a first information signal and a second information signal which differs from the first information signal comprises: first modulation means, arranged to receive the first information signal, for angle-modulating the received first information signal to produce a first angle-modulated information signal; second modulation means, arranged to receive the second information signal, for angle-modulating the received second information signal to produce a second angle-modulated information signal; reference frequency signal generating means for generating a first reference frequency signal and a second reference frequency signal which differs in frequency from the first reference frequency signal; first correction means for correcting, on the basis of the first reference frequency signal generated by the reference frequency signal generating means, a signal corresponding to a part in period of the first angle-modulated information signal produced from the first modulation means; second correction means for correcting, on the basis of the second reference frequency signal generated by the reference frequency signal generating means, a signal corresponding to a part in period of the second angle-modulated information signal produced from the second modulation means; and recording means for recording on the recording medium the first angle-modulated information signal corrected by the first correction means and the second angle-modulated information signal corrected by the second correction means.

It is another specific object of the invention to provide an information signal reproducing apparatus which is capable of not only removing time base variations occurring in an information signal reproduced from a recording medium but also making the deterioration of the information signal inconspicuous.

Under that object, an information signal reproducing apparatus arranged as an embodiment of the invention to reproduce a signal, consisting of first and second modulated information signals which differ from each other, from a recording medium on which the first and second modulated information signals are recorded comprises: reproducing means for reproducing from the recording medium the first modulated information signal having a part in period modulated to be of a first frequency and the second modulated information signal having a part in period modulated to be of a second frequency which differs from the first frequency; first demodulation means for demodulating the first modulated information signal reproduced by the reproducing means to produce a first demodulated information signal; second demodulation means for demodulating the second modulated information signal reproduced by the reproducing means to produce a second demodulated information signal; first correction means for correcting time base variations of the first demodulated information signal produced by the first demodulation means; second correction means for correcting time base variations of the second demodulated information signal produced by the second demodulation means; and correcting action control means for controlling correcting actions of the first correction means and the second correction means on the basis of at least one of the part in period of the first modulated information signal and the part in period of the second modulated information signal.

It is a further object of the invention to provide a video signal recording apparatus which is capable of recording, on a recording medium, a video signal in such a manner that, in reproducing the video signal consisting of a luminance signal and two color-difference signals, time base variations occurring in the video signal can be easily corrected without having recourse to any additional signal.

Under this object, a video signal recording apparatus arranged as an embodiment of this invention to record on a recording medium a video signal including a luminance signal and two color-difference signals comprises: first frequency modulation means, arranged to receive the luminance signal, for frequency-modulating the received luminance signal to produce a frequency-modulated luminance signal; color-difference line-sequential conversion means, arranged to receive the two color-difference signals, for converting the received two color-difference signals into a color-difference line-sequential signal to produce the color-difference line-sequential signal; second frequency modulation means for frequency-modulating the color-difference line-sequential signal produced by the color-difference line-sequential conversion means to produce a frequency-modulated color-difference line-sequential signal; reference frequency signal generating means for generating a first reference frequency signal and a second reference frequency signal which differs in frequency from the first reference frequency signal; first correction means for correcting a signal corresponding to a synchronizing signal period of the frequency-modulated luminance signal produced by the first frequency modulation means on the basis of the first reference frequency signal generated by the reference frequency signal generating means; second correction means for correcting a signal corresponding to a pedestal period of the frequency-modulated color-difference line-sequential signal on the basis of the second reference frequency signal generated by the reference frequency signal generating means; and recording means for recording on the recording medium the frequency-modulated luminance signal corrected by the first correction means and the frequency-modulated color-difference line-sequential signal corrected by the second correction means.

It is a further object of the invention to provide a video signal reproducing apparatus which removes time base variations from a luminance signal and two color-difference signals constituting a video signal reproduced from a recording medium and also makes deterioration of the video signal visually inconspicuous.

Under that object, a video signal reproducing apparatus arranged as an embodiment of this invention to reproduce a frequency-modulated luminance signal and a frequency-modulated color-difference line-sequential signal from a recording medium having a record of a video signal including the luminance signal and the color-difference line-sequential signal comprises: reproducing means for reproducing from the recording medium the frequency-modulated luminance signal in which a signal of a period corresponding to a synchronizing part is of a first frequency and the frequency-modulated color-difference line-sequential signal in which a signal of a period corresponding to a pedestal part is of a second frequency; first frequency demodulation means for frequency-demodulating the frequency-modulated luminance signal reproduced by the reproducing means to produce a luminance signal; second frequency demodulation means for frequency-demodulating the frequency-modulated color-difference line-sequential signal reproduced by the reproducing means to produce a color-difference line-sequential signal; first correction means for correcting time base variations of the luminance signal produced by the first frequency demodulation means; second correction means for correcting time base variations of the color-difference line-sequential signal produced by the second frequency demodulation means; correcting action control means for controlling correcting actions of the first correction means and the second correction means on the basis of at least one of the signal of a period corresponding to a synchronizing part of the frequency-modulated luminance signal and the signal of a period corresponding to a pedestal part of the frequency-modulated color-difference line-sequential signal; and simultaneous conversion means for converting the color-difference line-sequential signal whose time base variations have been corrected by the second correction means into simultaneous signals to produce two color-difference signals.

Other objects and features of the invention will be apparent from the following detailed description thereof taken in connection with the accompanying drawings.

DETAILED DESCRIPTION OF THE PREFERRED EMBODIMENTS:

The following describes this invention with reference to the accompanying drawings: In the case of embodiment described below, this invention is applied to a recording and/or reproducing apparatus of the kind recording or reproducing a video signal on or from a disc-shaped recording medium. However, the invention is not limited to the apparatuses of this kind but is applicable also to apparatuses of other kinds. For example, the invention is applicable to an apparatus using a tape-shaped recording medium. Further, such media that use optics or magnetism for recording are of course usable also in accordance with this invention.

Figure 1:
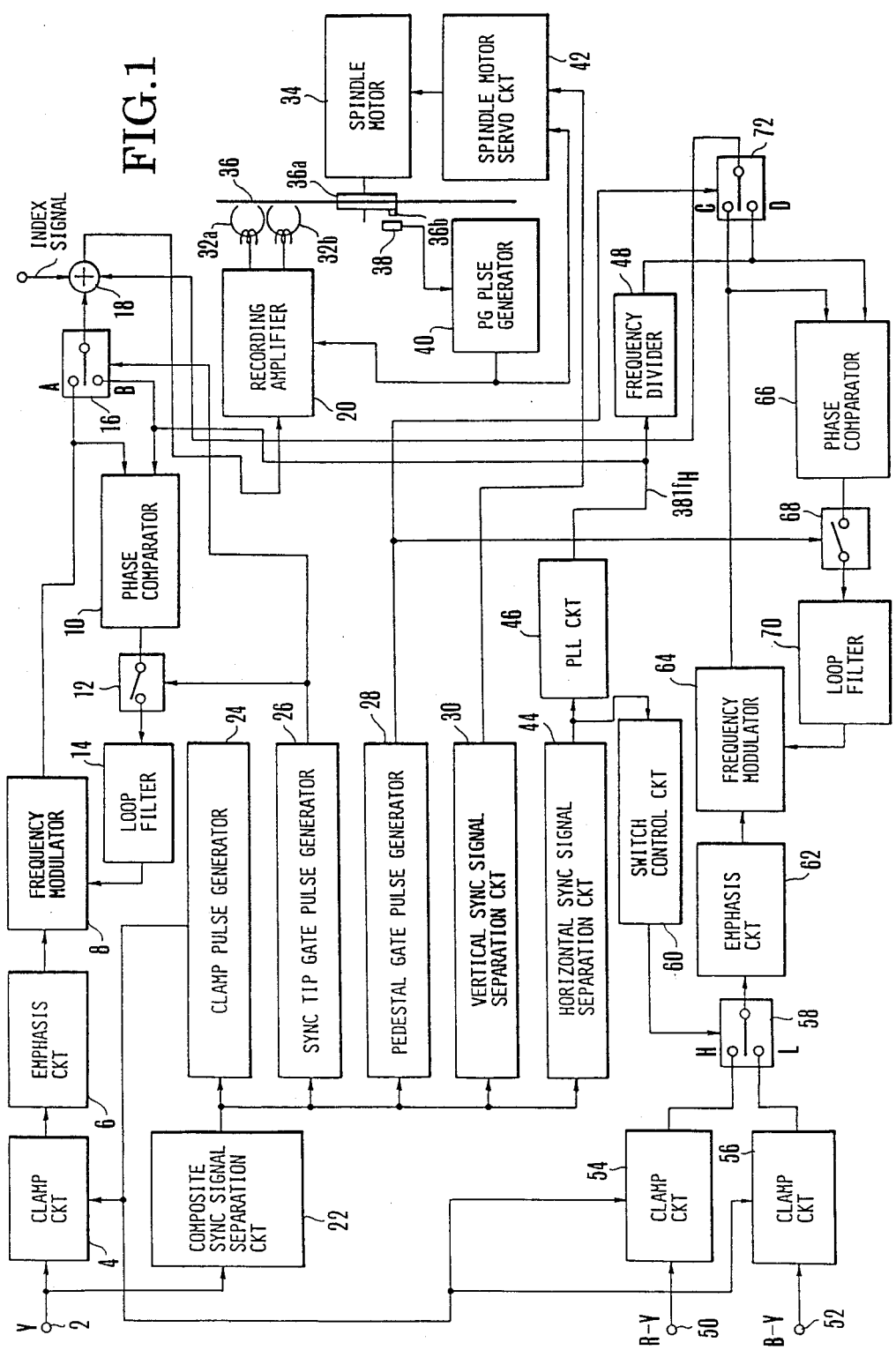
FIG. 1 is a block diagram showing in outline the arrangement of a recording apparatus embodying this invention.

FIG. 1 is a block diagram showing a recording apparatus arranged as an embodiment of the invention. Referring to FIG. 1, the illustration includes a luminance signal (Y) input terminal 2; a clamp circuit 4 which is arranged to clamp the sync tip level of a luminance signal at a given level; an emphasis circuit 6; a frequency modulator 8; a phase comparator 10; an on-off switch 12; a loop filter 14; a change-over switch 16; an adder 18; a recording amplifier 20; a composite sync signal separation circuit 22 for separating a composite sync signal from the luminance received from the input terminal 2; a clamp pulse generator 24; a sync tip gate pulse generator 26; a pedestal gate pulse generator 28; a vertical sync signal separation circuit 30; magnetic heads 32a and 32b; and a spindle motor 34 which is arranged to rotate a magnetic disc 36. The magnetic disc 36 is provided with a center core part 36a which is disposed in the middle part of the disc 36. A PG pin 36b which is provided for indicating the rotation phase of the magnetic disc 36 by rotating together with the disc 36 is disposed on the center core part 36a. A PG coil 38 is arranged to detect the position of the PG pin 36b. The PG coil 38 produces a detection signal every time it detects the PG pin 36b. The detection signal is supplied to a PG pulse generator 40 to have its wave form shaped into a PG pulse. The PG pulse from the PG pulse generator 40 and a vertical sync signal which is separated by the vertical sync signal separation circuit 30 are supplied to a spindle motor servo circuit 42. The rotation of the spindle motor 34 is controlled by the servo circuit 42 to keep a phase difference between the PG pulse and the vertical sync signal at a given value.

A reference numeral 44 denotes a horizontal sync signal separation circuit. A phase locked loop (hereinafter referred to as PLL) circuit 46 is arranged to oscillate a clock signal of 381 fH (fH: horizontal sync frequency) which is phase-locked to the horizontal sync signal separated by the horizontal sync signal separation circuit 44. A frequency divider 48 is arranged to frequency-divide to 1/5 the frequency of the clock signal of 381 fH. Input terminals 50 and 52 are arranged to receive color-difference signals R-Y and B-Y. Clamp circuits 54 and 56 are arranged to clamp the pedestal level of the color-difference signals at predetermined levels. A change-over switch 58 is arranged to bring the simultaneously supplied color-difference signals R-Y and B-Y into a color-difference line-sequential signal wherein the color-difference signals included as different components alternately appear every horizontal scanning period. The illustration further includes a switch control circuit 60, an emphasis circuit 62; a frequency modulator 64; a phase comparator 66; an on-off switch 68; a loop filter 70; and a change-over switch 72.

The recording apparatus which is arranged as shown in FIG. 1 operates as follows: The input video signal may be either a composite video signal such as the TV signal of the NTSC system or a component video signal such as an RGB signal. In either case, the video signal is assumed to have been converted and separated by known circuits into color-difference signals R-Y and B-Y and a luminance signal Y which includes a composite sync signal before coming to the circuit of FIG. 1.

The luminance signal Y which is received at the input terminal 2 is supplied to the composite sync signal separation circuit 22 to have the composite sync signal separated. The separated composite sync signal is supplied to a clamp pulse generator 24. The clamp pulse generator 24 then forms a clamp pulse at a timing according to a horizontal sync signal obtained from the composite sync signal. Then, in accordance with the clamp pulse formed by the clamp pulse generator 24, the clamp circuit 4 clamps the horizontal sync signal part of the luminance signal Y at a given DC potential before producing the luminance signal Y.

With its horizontal sync signal part clamped at the given DC potential by the clamp circuit 4, the input luminance signal is supplied to the emphasis circuit 6. The emphasis circuit 6 corrects the luminance signal to have a given frequency characteristic (raising the level of the high band frequency component thereof, for example.) The corrected luminance signal is then supplied to the frequency modulator 8 to be modulated to have a frequency allocation as shown by a reference symbol YFM in FIG. 3.

Figure 2:
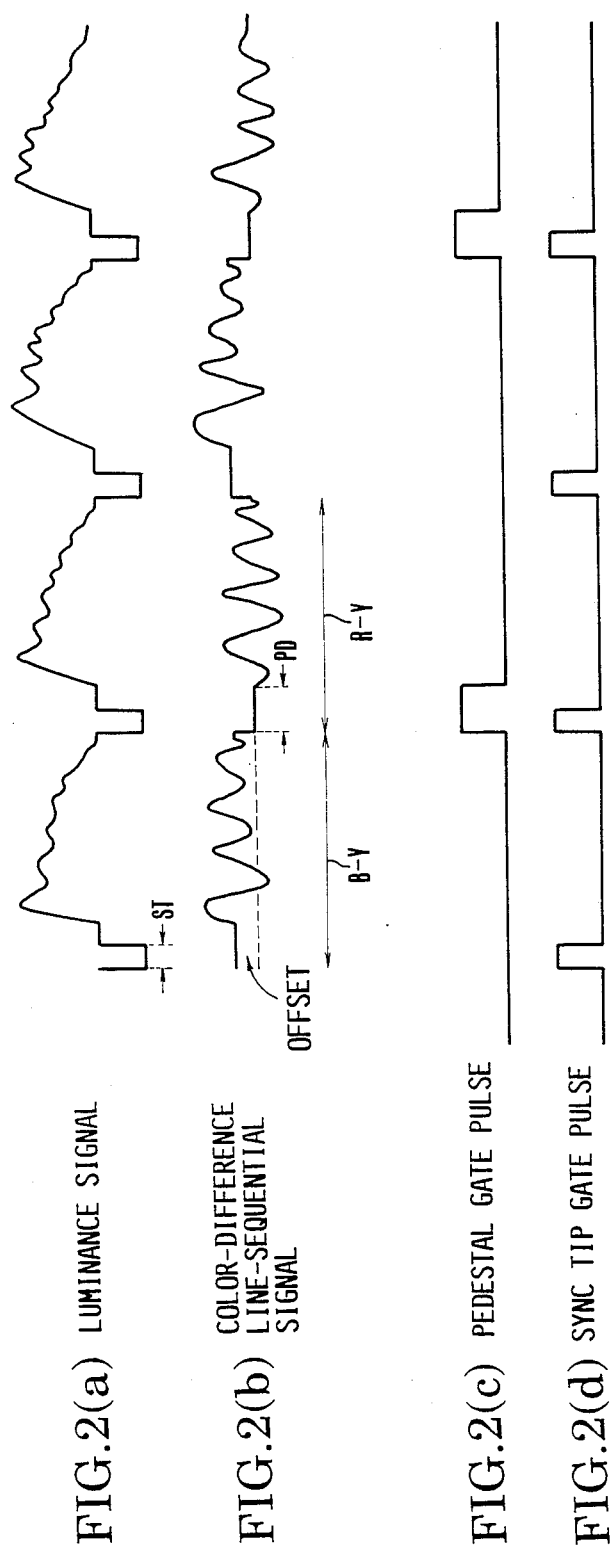
FIGS. 2(a) to 2(d) show in a timing chart the operation of the recording apparatus shown in FIG. 1.

The luminance signal that has been frequency-modulated by the frequency modulator 8 is supplied to the change-over switch 16 and the phase comparator 10. Meanwhile, the horizontal sync signal which has been separated by the horizontal sync signal separation circuit 44 from the composite sync signal separated by the composite sync signal separation circuit 22 is supplied to the PLL circuit 46. The PLL circuit 46 then forms a clock signal of 381 fH (=5.995 MHz) which is 381 times as high as the frequency fH of the horizontal sync signal and is phase-locked thereto. This clock signal is supplied to the phase comparator 10. The phase comparator 10 then phase-compares the frequency-modulated luminance signal with the clock signal of 381 fH. An error signal thus obtained is supplied to the on-off switch 12. The on-off switch 12 is arranged as follows: The sync tip gate pulse which is formed as shown in FIG. 2(d) by the sync tip gate pulse generator 26 and is at a high level only during the sync tip period of the sync signal added to the input luminance signal. In response to this sync tip gate pulse, the on-off switch 12 becomes conductive only for a period ST which corresponds to the sync tip of the input luminance signal as shown in FIG. 2(a). The error signal from the phase comparator 10 is supplied to the loop filter 14 during the conductive period of the on-off switch 12. At that moment, the sync tip gate pulse generated by the sync tip gate pulse generator 26 enables the conductive period of the switch 12 to avoid any distorted part of wave form caused by the emphasizing action of the emphasis circuit 6.

The error signal from the phase comparator 10 is supplied via the on-off switch 12 to the loop filter 14. The loop filter 14 integrates the error signal. The integrated signal produced from the loop filter 14 controls the modulating action of the frequency modulator 8. This forms a PLL loop: The frequency modulator 8 — the phase comparator 10 — the on-off switch 12 — the loop filter 14 — the frequency modulator 8. The sync tip part frequency of the luminance signal modulated by the frequency modulator 8 is fixedly set at the frequency 381 fH of the clock signal produced from the PLL circuit 46.

Through the above stated PLL loop, the frequency-modulated luminance signal which has been corrected to have its sync tip signal part at the fixed frequency is supplied to one side A of the change-over switch 16. The switch 16 performs its switching action according to the sync tip gate pulse. In other words, during a period corresponding to the sync tip of the input luminance signal (while the sync tip gate pulse is at a high level,) the change-over switch 16 is on the other side B thereof. During this period, the clock signal of 381 fH from the PLL circuit 46 is produced from the change-over switch 16. This causes the signal corresponding to the sync tip part of the frequency-modulated luminance signal to be replaced with the clock signal of 381 fH. During a period other than the above stated period (or while the sync tip gate pulse is at a low level,) the change-over switch 16 is on the connecting side A thereof to allow the frequency-modulated luminance signal from the frequency modulator 8 to be supplied as it is to the adder 18.

The color-difference signals R-Y and B-Y which come through the input terminals 50 and 52 are supplied to the clamp circuits 54 and 56. Their pedestal levels are then clamped to be at a given DC potential. A clamp pulse for clamping is generated from the clamp pulse generator 24 in the same manner as in the case of the luminance signal. With the input color-difference signals thus clamped at the given DC potential by the clamp circuits 54 and 56, they are respectively supplied to the change-over switch 58. The change-over switch 58 is arranged to convert the input color-difference signals into a known color-difference line-sequential signal. The switching action of the switch 58 is controlled by the switch control circuit 60. More specifically, the horizontal sync signal separated by the horizontal sync signal separation circuit 44 is supplied to the switch control circuit 60. The switch control circuit 60 forms a switch control signal the level of which changes between high and low levels every horizontal sync period in synchronism with the horizontal sync signal This switch control signal is supplied to the change-over switch 58. In response to this control signal, the connecting position of the change-over switch 58 is on one side H thereof while the switch control signal is at a high level and on the other side L while the switch control signal is at a low level. The arrangement is such that the change-over switch 58 alternately produces the color-difference signals R-Y and B-Y every horizontal sync period in the form of the color-difference line-sequential signal. The line-sequential signal is supplied to the emphasis circuit 62.

The emphasis circuit 62 performs a required emphasizing action on the color-difference line-sequential signal and supplies it to the frequency modulator 64. The emphasized color-difference line-sequential signal is frequency-modulated by the frequency modulator 64 to have frequency allocation as indicated at a part CFM in FIG. 3. The frequency-modulated color-difference line-sequential signal is supplied to the change-over switch 72 and the phase comparator 66. Meanwhile, to the phase comparator 66 is also supplied a clock signal of 381 fH /5(=1.199 MHz) which is obtained through the frequency divider 48 by 1/5 dividing the clock signal of 381 fH formed by the PLL circuit 46. The phase comparator 66 phase compares the frequency-modulated color-difference line-sequential signal with the clock signal of 381 fH / 5 and produces an error signal, which is supplied to the on-off switch 68. Further, the pedestal gate pulse which is formed by the pedestal gate pulse generator 28 is at a high level only during a blanking period preceding the color-difference signal R-Y included in the color-difference line-sequential signal as shown in FIG. 2(c). In response to this pedestal gate pulse, the on-off switch 68 becomes conductive only during the blanking period preceding the color-difference signal R-Y of the color-difference line sequential signal as shown in FIG. 2(b). The error signal of the phase comparator 66 is, therefore, supplied to the loop filter 70 only during the conductive period of the on-off switch 68. The loop filter 70 integrates the error signal supplied via the on-off switch 68 from the phase comparator 66. The frequency modulating action of the frequency modulator 64 is controlled by a signal produced from the loop filter 70 as a result of the integrating action. A PLL loop consisting of the frequency modulator 64 — the phase comparator 66 — the on-off switch 68 — the loop filter 70 — the frequency modulator 64 serves to fix the frequency of a signal portion corresponding to the blanking period preceding the color-difference signal R-Y within the color-difference line-sequential signal modulated by the frequency modulator 64 to be at 1/5 of the frequency 381 fH of the clock signal produced from the frequency divider 48.

The frequency-modulated color-difference line-sequential signal which has a signal part corresponding to the blanking part preceding the color-difference signal R-Y thereof corrected to be at the fixed frequency is supplied to one side C of the change-over switch 72. Further, the change-over switch 72 performs its switching action in accordance with the pedestal gate pulse produced from the above stated pedestal gate pulse generator 28. In other words, during the blanking period preceding the color-difference signal R-Y of the color-difference line-sequential signal (during which the pedestal gate pulse is at a high level), the change-over switch 72 is on its connecting side D. During this period, the change-over switch 72 allows the clock signal of 381 fH / 5 from the frequency divider 48 to be produced therefrom. By this, the signal part corresponding to the blanking period preceding the color-difference signal R-Y of the frequency modulated color-difference line-sequential signal is replaced with the clock signal of 381 fH / 5. During a period other than this, that is, while the pedestal gate pulse is at a low level, the change-over switch 72 is on the connecting side C thereof. Then, the frequency modulated color-difference line-sequential signal produced from the frequency modulator 64 is allowed to be supplied as it is to the adder 18.

Figure 3:
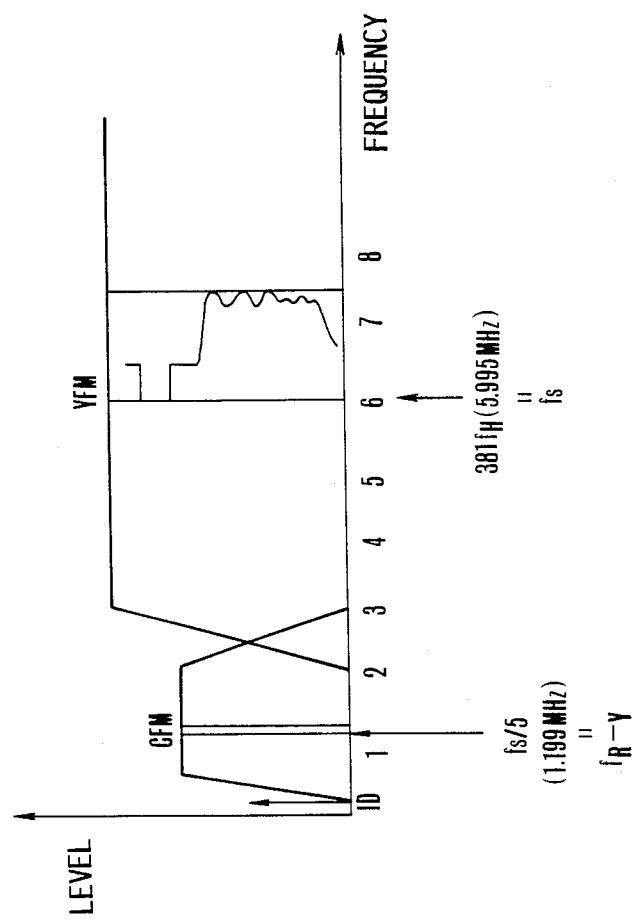
FIG. 3 shows the frequency allocation obtained by the recording apparatus of FIG. 1 after a luminance signal and a color-difference line-sequential signal are frequency-modulated and frequency-multiplexed.

The frequency-modulated luminance signal (YFM) and the frequency-modulated color-difference line-sequential signal (CFM) are frequency-multiplexed at the adder 18 as shown in FIG. 3. The multiplexed signal is supplied to the recording amplifier 20. FIG. 3 shows frequency allocation of an index signal ID including the frequencies of recording mode data, a track number, a signal discriminating between black-and-white and color signals, etc. An ID signal generator which is not shown generates the index signal having information corresponding to instructions produced from a system controller (not shown). This index signal is frequency-multiplexed with other signals by the adder 18. The output of the adder 18 is supplied to the recording amplifier 20 for amplification.

The signal amplified by the recording amplifier 20 is supplied alternately to the magnetic heads 32a and 32b to be recorded on the magnetic disc 36. Control over the recording timing of the magnetic recording, the rotation phase of the magnetic disc 36 is synchronized with the vertical sync signal which is separated from the composite sync signal by the vertical sync signal separation circuit 30. For this purpose, the position of the PG pin 36b which is disposed on the center core 36a of the magnetic disc 36 is detected by the PG coil 38. The PG coil 38 then produces a detection pulse, which is supplied to the PG pulse generator 40 for wave form shaping. The PG pulse generator 40 thus forms a PG pulse which is supplied to the spindle motor control circuit 42 along with the above stated vertical sync signal. The control circuit 42 then controls the rotating action of the spindle motor 34.

The recording apparatus which is shown in FIG. 1 performs a recording operation in the manner as described above. In the case of this embodiment, the invention is applied to a still video system. The frequency allocation of the signal recorded on the magnetic disc 36 as shown in FIG. 3 is set in conformity to the standardized specifications for still video floppy discs.

Figure 4:
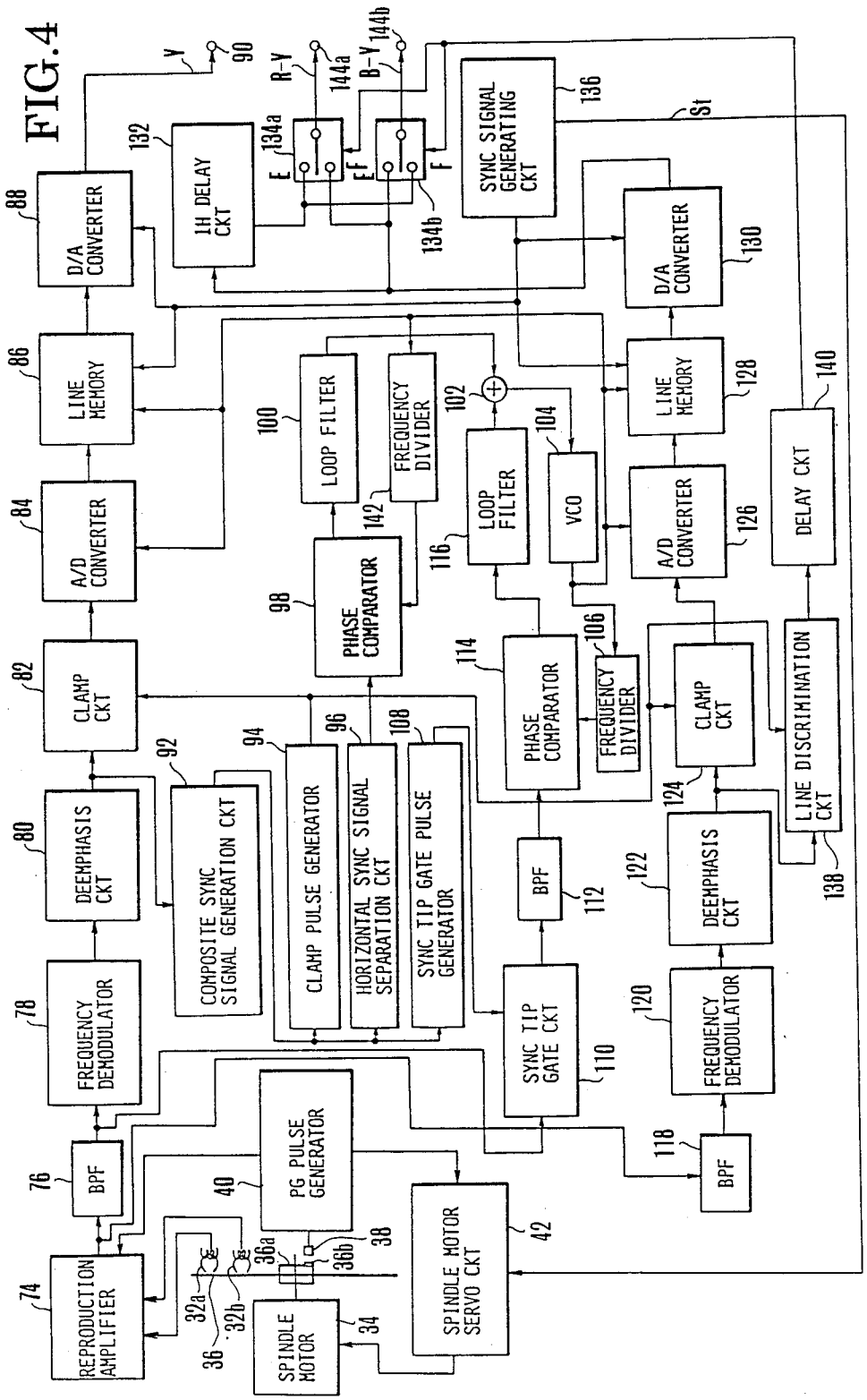
FIG. 4 is a block diagram showing in outline the arrangement of a reproducing apparatus which corresponds to the recording apparatus of FIG. 1.

A reproducing apparatus which corresponds to the recording apparatus of FIG. 1 is arranged as shown in FIG. 4. Referring to FIG. 4, which is a block diagram, the reproducing apparatus is arranged as follows: The illustration includes a reproduction amplifier 74; a bandpass filter (hereinafter referred to as BPF) 76; a frequency demodulator 78 for demodulating the frequency-modulated luminance signal; a deemphasis circuit 80; a clamp circuit 82; an analog-to-digital (A/D) converter 84; a line memory 86; a digital-to-analog (D/A) converter 88; and an output terminal 90 for a reproduced luminance signal Y; a composite sync signal separation circuit 92; a clamp pulse generator 94; a horizontal sync signal separation circuit 96; a phase comparator 98; a loop filter 100; an adder 102; a voltage controlled oscillator (hereinafter referred to as VCO) 104; a frequency divider 106; a sync tip gate pulse generator 108; a sync tip gate circuit 110; a BPF 112; a phase comparator 114; a loop filter 116; a BPF 118 for separating a frequency-modulated color-difference line-sequential signal; a frequency demodulator 120 for demodulating the frequency-modulated color-difference line-sequential signal; a deemphasis circuit 122; a clamp circuit 124; an A/D converter 126; a line memory 128; a D/A converter 130; a 1H (one horizontal sync period) delay circuit 132; change-over switches 134a and 134b which are arranged to convert the color-difference line-sequential signal into line-simultaneous signals; a sync signal generating circuit 136; a line discrimination circuit 138 which is arranged to discriminate the sequence of the color-difference signals R-Y and B-Y constituting the color-difference line-sequential signal; a delay circuit 140; a frequency divider 142; an output terminal 144a for the color-difference signal R-Y; and an output terminal 144b which is for the color-difference signal B-Y.

Again referring to FIG. 4, the reproducing apparatus of this embodiment operates as follows: For reproduction, the sync signal generating circuit 136 which is arranged to generate a stable sync signal by quartz crystal oscillation. The circuit 136 supplies a spindle motor rotation reference signal St to the spindle motor servo circuit 42. Meanwhile, to the spindle motor servo circuit 42 is also supplied the PG pulse which is generated by the PG pulse generator 40 in synchronism with the detection pulse produced from the PG coil 38 by detecting the PG pin 36b. The spindle servo motor circuit 42 compares the phases of the two input signals and controls the rotation of the spindle motor 34 in such a way as to keep the two in a state of having a given phase difference between them.

The magnetic disc 36 is thus caused to rotate at a given rotational frequency and to be phase-locked with the spindle motor rotation reference signal St produced by the sync signal generating circuit 136. After that, a signal recorded on the magnetic disc 36 is reproduced by the magnetic heads 32a and 32b. The reproduced signals thus obtained from the magnetic heads 32a and 32b are very small. Therefore, the reproduced signals are amplified by the reproduction amplifier 74 before they are supplied to the BPFs 76 and 118 respectively.

A frequency-modulated luminance signal is separated from the reproduced signal supplied to the BPF 76 and is supplied to the frequency demodulator 78 and the sync tip gate circuit 110. The luminance signal is produced from the frequency demodulator 78 as a reproduced luminance signal, which is then deemphasized by a deemphasis circuit 80 which has a characteristic reverse to that of the emphasis circuit 6 of FIG. 1. The deemphasized luminance signal is clamped by the clamp circuit 82. The clamping action of the clamp circuit 82 is performed in synchronism with a clamp pulse formed by the clamp pulse generator 94 on the basis of a composite sync signal which is separated by the composite sync signal separation circuit 92 from the reproduced luminance signal which has been deemphasized.

The reproduced luminance signal which is clamped by the clamp circuit 82 is supplied to the A/D converter 84 to be converted into a digital signal at a rate of, say, eight bits per sample. The digital signal thus obtained is supplied to the line memory 86. The line memory 86 is arranged to have writing and reading actions controlled respectively by writing clock and reading clock signals which are separately arranged from each other. In the case of this embodiment, the writing clock signal is in association with the time base variations occurring during the process of reproduction as will be described later herein. The reading clock signal is a stable clock signal obtained on the basis of quartz crystal oscillation. Time base variations occurring during the process of reproduction are removed from the reproduced luminance signal read out from the line memory 86. After removal of the time base variations, the reproduced luminance signal is supplied to the D/A converter 88 to be converted into an analog signal form and is produced from the output terminal 90.

The above stated writing clock signal to be applied to the line memory 86 is formed in the following manner: The reproduced frequency-modulated luminance signal which is separated from the reproduced signal by the BPF 76 is supplied to the sync tip gate circuit 110. Meanwhile, the sync tip gate circuit 110 receives also a sync tip gate pulse obtained from the composite sync signal by the sync tip gate pulse generator 108. At the sync tip gate circuit 110, a frequency-modulated signal portion corresponding to a sync tip part is extracted from the reproduced frequency-modulated luminance signal which is supplied at the timing of the sync tip gate pulse. The extracted frequency-modulated signal portion corresponding to the sync tip part is supplied to the BPF 112 to have its unnecessary frequency component removed there and is then supplied to the phase comparator 114.

To the phase comparator 114 is supplied a clock signal which is obtained through the frequency divider 106 by dividing to ½ the frequency of the clock signal produced from the VCO 104. The frequency-modulated signal portion corresponding to the sync tip part is phase-compared with this frequency-divided clock signal. A phase error signal thus obtained is supplied to the adder 102 after a required correcting action is performed on the error signal by the loop filter 116.

Further, a horizontal sync signal which is separated from the composite sync signal by the horizontal sync signal separation circuit 96 is supplied to the phase comparator 98 to be phase-compared with a clock signal which is obtained at the frequency divider 142 by dividing to 1/762 the frequency of the clock signal produced from the VCO 104. A phase error signal thus produced from the phase comparator 98 undergoes a required correcting action performed by the loop filter 100. The corrected error signal is supplied to the adder 102.

At the adder 102, the phase error signal relative to the sync tip part and the phase error signal relative to the horizontal sync signal are added together. The result of addition thus obtained is supplied to the VCO 104 to control the phase of the clock signal generated by the VCO 104. The clock signal generated by the VCO 104 is thus phase-locked with a signal corresponding to the sync tip part of the reproduced frequency-modulated luminance signal under this control. Further, the clock signal produced from the VCO 104 is supplied to the A/D converter 84 and the line memory 86 and serves as a writing clock signal for the line memory 86. The reproduced luminance signal is digitized and written into the line memory 86 in synchronism with the clock signal produced from the VCO 104.

In writing the digitized reproduced luminance signal into the line memory 86, the clock signal which is phase-locked with the frequency modulated signal corresponding to the sync tip part of the reproduced frequency-modulated luminance signal and the horizontal sync signal separated from the reproduced luminance signal is used as the writing clock signal as mentioned above. The reproduced luminance signal which has time base variations are thus written in the line memory 86 in synchronism with the writing clock signal which has time base variations similar to that of the reproduced luminance signal. Therefore, the time base variations of the luminance signal occurring during the process of reproduction can be removed by reading out the written, reproduced luminance signal from the line memory 86 in synchronism with the reading clock signal which is stably obtained from the sync signal generating circuit 136 operated by quartz crystal oscillation.

In controlling the phase of the clock signal of the VCO 104, the phase error signal relative to the horizontal sync signal is arranged to be employed in addition to the phase error signal which is relative to the sync tip part. This arrangement is made for the purpose of preventing a so-called side lock phenomenon from occurring in the PLL. The term "side lock phenomenon" means: In performing such dispersive phase control as the phase control performed over the signal generated from the VCO only for the sync tip period obtained during one horizontal sync period, as in the case of this embodiment, the PLL locks in a cycle which is an integer times as high as the timing of the dispersive phase control. In the case of this embodiment, the phase of the clock signal produced from the VCO 104 might be locked in a cycle of 762 fH±n fH (n: a positive integer). The side lock phenomenon is preventable by the additional use of the phase error signal related to the horizontal sync signal for the phase control of the VCO 104.

Meanwhile, at the BPF 118, a frequency-modulated color-difference line-sequential signal is separated from the reproduced signal coming to the BPF 118. The frequency-modulated color-difference line-sequential signal which is thus separated is supplied to the frequency demodulator 120 to be demodulated into a reproduced color-difference line-sequential signal. After that, this signal comes to be deemphasized at the deemphasis circuit 122 which is of a characteristic reverse to that of the emphasis circuit of FIG. 1. The deemphasized signal is supplied to the clamp circuit 124 and the line discrimination circuit 138. The reproduced color-difference line-sequential signal is clamped by the clamp circuit 124 and is then converted into a digital signal having, for example, eight bits per sample. The digital signal is supplied to the line memory 128.

The writing and reading actions on the line memory 128 is controlled by the writing and reading clock signals which are separately arranged. The writing and reading clock signals are arranged to be the same as the clock signal supplied to the line memory 86 for the purpose of storing the reproduced luminance signal. By virtue of this arrangement, the part of the time base variations that occurs in the reproduced color-difference line-sequential signal during the process of reproduction is removed before the signal is supplied to the D/A converter 130. The color-difference line-sequential signal is converted into analog signal by the D/A converter 130 and is then supplied to the 1 H (H: one horizontal sync period) delay circuit 132 and the change-over switch 134b.

The change-over switches 134a and 134b and the 1 H delay circuit 132 are provided for changing the reproduced color-difference line-sequential signal into simultaneous color-difference signals.

In recording, the color-difference line-sequential signal is recorded in such a manner that the color-difference signal B-Y has its zero level offset relative to the other color-difference signal R-Y as shown in FIG. 2(b). In reproducing, therefore, the line discrimination circuit 138 which receives the reproduced color-difference line-sequential signal and the clamp pulse performs level detection at the timing of the clamp pulse and makes a discrimination between a signal R-Y multiplexed line and a signal B-Y multiplexed line by finding whether the zero level is offset or not. The line discrimination circuit 138 then produces a line discrimination signal showing the result of the discrimination.

The line discrimination signal produced from the line discrimination circuit 138 is supplied to the delay circuit 140 to have its timing corrected in relation to other circuit operations. After the timing correction, the line discrimination signal is supplied to the change-over switches 134a and 134b. The connecting position of each of these switches 134a and 134b is on one side E when the color-difference signal B-Y is multiplexed on the line and is on the other side F when the other color-difference signal R-Y is multiplexed on the line. The 1 H delay circuit 132 is connected to the side E of the change-over switch 134a and to the side F of the change-over switch 134b. The delay circuit 132 produces the signal B-Y while the signal R-Y is produced from the D/A converter 130 and the signal R-Y while the signal B-Y is produced from the D/A converter 130. Therefore, the reproduced color-difference line-sequential signal produced from the D/A converter 130 is changed into simultaneous signals. As a result, the color-difference signal R-Y is produced from the output terminal 144a and the color-difference signal B-Y from the output terminal 144a respectively. By this arrangement, the time base variations which occur in the reproduced color-difference line-sequential signal during the process of reproduction can be removed and the signal can be changed into simultaneous color-difference signals.

The luminance signal and the color-difference signals R-Y and B-Y which are reproduced in the manner described above can be supplied to a video printer, a monitor TV set, etc., by converting them by a matrix circuit or the like, for example, into some other component video signals such as an RGB signal, etc. or into a composite video signal such as the TV signal of the NTSC system.

In this embodiment, the frequency-modulated luminance signal and the frequency-modulated color-difference line-sequential signal are phase controlled during predetermined periods, in recording, on the basis of different reference signals formed by one and the same reference signal generator. These frequency-modulated signals are thus kept in a given phasic relation. Therefore, even in the event of a moiré brought about by the interference between the carrier signals of the frequency-modulated signals, the moiré appears in a fixed pattern on the image plane of the monitor, so that it can be kept visually inconspicuous. In other words, assuming that the frequency modulation carrier frequency of the luminance signal is fy and that of the color-difference line-sequential signal is fc, when the frequency-modulated luminance signal and the frequency-modulated color-difference signal which are frequency-modulated by these frequency modulation carrier frequencies are recorded by multiplexing them, a cross modulation distorted component which is causing the moiré can be expressed as follows:

$$fy \pm fc, fy \pm 2 fc$$

Figure 5:
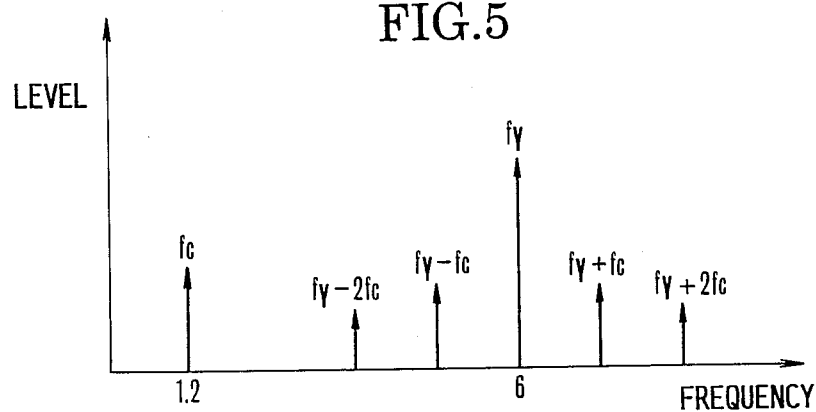
FIG. 5 shows the frequency allocation of a moiré component which is generated during reproduction.

Then, the frequency allocation becomes as shown in FIG. 5.

In case that the frequency-modulated multiplexed signal is reproduced with the cross modulation distortion and is then demodulated by separating the frequency-modulated luminance signal, the cross modulation distortion tends to result in a moiré which appears on the monitor image plane. If the moire pattern is not in phase with the carrier frequencies fy and fc, it would appear in a random pattern on the monitor image plane.

Figure 6:
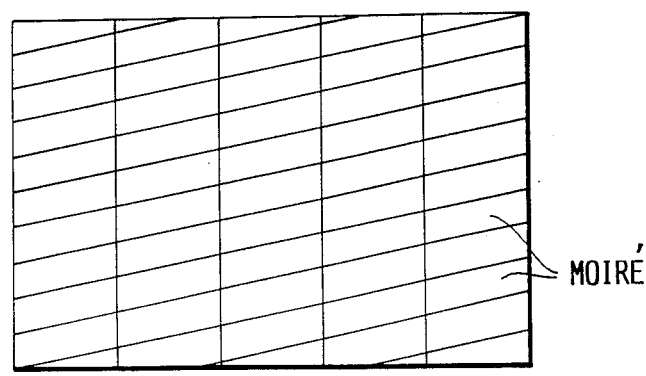
FIG. 6 shows a moiré pattern obtained on a monitor image plane during reproduction by the reproducing apparatus of FIG. 3.

Whereas, in the case of this embodiment, since the frequencies fy and fc are corrected by using reference signals formed by one and the same reference signal generator, the frequencies fy and fc are in phase to cause the moiré to appear in a fixed pattern on the monitor image plane as shown in FIG. 6.

Further, in the event of fc=m fH (m: a positive integer), moiré comes to present a vertical striped pattern. However, in the case of this embodiment, there obtains the following relation as shown in FIG. 3:

$$fc = f_{R-Y} = 381 \text{ fH} / 5$$

Therefore, the moiré appears in a slanting fixed pattern as shown in FIG. 6. Further, as stated in the foregoing, a fixed moiré pattern is visually inconspicuous. Besides, it is easily removable by the use of a comb filter.

In the case of this embodiment, the invention is applied to an apparatus arranged to record and reproduce signals in conformity with the standardized specifications for still video floppy discs. However, the invention is not limited to the apparatus of that kind. For example, the invention is applicable also to a recording and/or reproducing apparatus of the kind having a frequency allocation as shown in FIG. 7.

Figure 7:
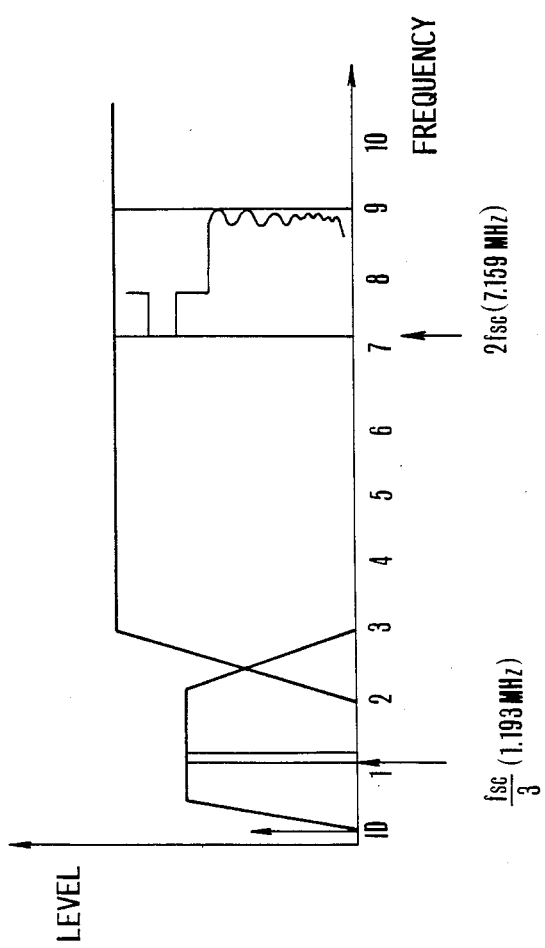
FIG. 7 shows the frequency allocation obtained after a luminance signal and a color-difference line-sequential signal are frequency-modulated and frequency-multiplexed by a recording apparatus which is arranged according to this invention as another embodiment thereof.

In recording a luminance signal and a color-difference line-sequential signal with such a frequency allocation as shown in FIG. 7, the recording apparatus shown in FIG. 1 is arranged to have the reference signal which is to be used in frequency-modulating the luminance signal set at 2 fsc in such a manner that a signal part corresponding to the sync tip part of the frequency-modulated luminance signal has the frequency of 2 fsc. Further, in frequency-modulating the color-difference line-sequential signal, the reference signal which is to be used for this purpose is obtained by dividing the frequency fsc to ⅓ thereof. The line-sequential signal is thus modulated to have a signal part corresponding to the pedestal part preceding the color-difference signal R-Y in the line-sequential signal at the frequency of fsc/3. Meanwhile, the reproducing apparatus is also modified according to the modification made for the recording apparatus. The modification gives the same advantageous effect as this embodiment.

Further, in the reproducing operation of this embodiment, a signal part corresponding to the sync tip part of the frequency-modulated luminance signal is used for correcting the time base variations occurring during the process of reproduction as shown in FIG. 4. However, the invention is not limited to this arrangement. The time base variations occurring during reproduction may be corrected by using a signal part corresponding to the pedestal part preceding the signal R-Y in the frequency-modulated color-difference line-sequential signal. Further, the time base variations of both the reproduced luminance signal and the reproduced color-difference line-sequential signal occurring during reproduction may be removed by using both the signal parts.

In respect to the color-difference line-sequential signal, the PLL is arranged to control the modulating action during recording in such a manner that a signal part corresponding to the pedestal part preceding the signal R-Y is at a frequency of 381 fH/5 after frequency modulation. However, this arrangement may be changed to control the modulating action in such a way as to cause a signal part corresponding to the pedestal part preceding the signal B-Y, instead of the signal R-Y, to be at a given frequency after frequency modulation. Further, the PLL may be arranged to fix the frequencies of two pedestal parts preceding both the signals R-Y and B-Y. Such arrangement ensures more accurate correction of the time base variations.

Further, in carrying out frequency modulation during a recording operation, the PLL is used for controlling and causing the signal part corresponding to the sync tip part of the luminance signal and the signal part corresponding to the pedestal part of the color-difference line-sequential signal to be at given frequencies after frequency modulation respectively as mentioned above. However, the use of PLL may be replaced with the use of some other means such as a change-over switch or the like in such a way as to replace the signal parts corresponding to the sync tip part and the pedestal part simply with reference signals. Such a modification is also capable of causing the moiré which occurs during reproduction to be fixed on the monitor image plane.

Further, in frequency-modulating for recording, a signal part corresponding to the sync tip part of the luminance signal and a signal part corresponding to the pedestal part of the color-difference line-sequential signal are controlled by the PLL to have predetermined frequencies after frequency modulation. However, this arrangement of the embodiment may be changed to use some change-over switch in place of the PLL for replacing the use of the signal parts corresponding to the sync tip part and the pedestal part with the use of the reference signals. The moiré that occurs during the process of reproduction also can be fixed on the monitor image plane by this modification.

As described in the foregoing, the recording apparatus and the reproducing apparatus according to this invention are not only capable of solving the problem of the conventional apparatus but also causes the moiré pattern that appears on the monitor during reproduction to become an inconspicuous fixed pattern.

What is claimed is:

1. An information signal recording apparatus for recording on a recording medium a first information signal and a second information signal which differs from the first information signal, the first information signal having a period part and the second information signal having a period part, comprising:
   (a) first modulation means, arranged to receive the first information signal, for angle-modulating the received first information signal to produce a first angle-modulated information signal;
   (b) second modulation means, arranged to receive the second information signal, for angle-modulating the received second information signal to produce a second angle-modulated information signal;
   (c) reference frequency signal generating means for generating a first reference frequency signal and a second reference frequency signal which differs in frequency from said first reference frequency signal;
   (d) first correction means for correcting a signal corresponding to the period part of the first angle-modulated information signal produced by said first modulation means, on the basis of the first reference frequency signal generated by said reference frequency signal generating means;
   (e) second correction means for correcting a signal corresponding to the period part of the second angle-modulated information signal produced by said second modulation means, on the basis of the second reference frequency signal generated by said reference frequency signal generating means; and
   (f) recording means for recording on said recording medium the first angle-modulated information signal corrected by said first correction means and the second angle-modulated information signal corrected by said second correction means.

2. An apparatus according to claim 1, wherein said first information signal includes a luminance signal where the period part is a synchronizing signal part, and wherein said second information signal includes a chrominance signal where the period part is a pedestal part.

3. An apparatus according to claim 2, further comprising synchronizing signal separation means, arranged to receive said luminance signal, for separating a synchronizing signal part from said luminance signal.

4. An apparatus according to claim 3, wherein said first correction means includes:
   (a) first phase comparison means for comparing the phase of an angle-modulated luminance signal produced by said first modulation means with that of said first reference frequency signal produced by said reference frequency signal generating means to produce a first phase error signal indicative of the result of said comparison; and
   (b) first phase error signal supply means for supplying said first phase error signal produced by said first phase comparison means to said first modulation means according to the synchronizing signal part separated by said synchronizing signal separation means for a period during which the synchronizing signal part of said luminance signal is supplied to said first modulation means.

5. An apparatus according to claim 4, wherein said second correction means includes:
   (a) second phase error comparison means for comparing the phase of an angle-modulated chrominance signal produced by said second modulation means with that of said second reference frequency signal produced by said reference frequency signal generating means to produce a second phase error signal indicative of the result of said comparison; and
   (b) second phase error signal supply means for supplying said second phase error signal produced by said second phase comparison means to said second modulation means according to the synchronizing signal part separated by said synchronizing signal separation means for a period during which the pedestal part of said chrominance signal is supplied to said second modulation means.

6. An apparatus according to claim 4, wherein said first modulation means is arranged to angle-modulate the input luminance signal, in accordance with said first phase error signal supplied from said first phase error signal supply means, in such a manner that the phase of the synchronizing signal part of said angle-modulated luminance signal is synchronized with that of the first reference frequency signal generated by said reference frequency signal generating means.

7. An apparatus according to claim 5, wherein said second modulation means is arranged to angle-modulate the input chrominance signal, in accordance with said second phase error signal supplied from said second phase error signal supply means, in such a manner that the phase of the pedestal part of said angle-modulated chrominance signal is synchronized with that of said second reference frequency signal generated by said reference frequency signal generating means.

8. An apparatus according to claim 4, wherein said first correction means further includes first output switching means arranged to output, in accordance with the synchronizing signal part separated by said synchronizing signal separation means, said first reference frequency signal produced by said reference frequency signal generating means for a first period during which the synchronizing signal part of said angle-modulated luminance signal is output from said first modulation means, and to output said angle-modulated luminance signal produced by said first modulation means during a period other than said first period.

9. An apparatus according to claim 5, wherein said second correction means further includes a second output switching means arranged to output, in accordance with the synchronizing signal part separated by said synchronizing signal separation means, said second reference frequency signal produced by said reference frequency signal generating means for a second period during which the pedestal part of the angle-modulated chrominance signal is output from said second modulation means, and to output said angle-modulated chrominance signal produced by said second modulation means during a period other than said second period.

10. An information signal reproducing apparatus for reproducing a signal consisting of first and second modulated information signals which differ from each other from a recording medium on which said first and second modulated information signals are recorded, the first modulated information signal having a period part modulated to be a first frequency and the second modulated information signal having a period part modulated to be a second frequency which differs from the first frequency, comprising:
  (a) reproducing means for reproducing from said recording medium said first modulated information signal and said second modulated information signal;
  (b) first demodulation means for demodulating said first modulated information signal reproduced by said reproducing means to produce a first demodulated information signal;
  (c) second demodulation means for demodulating said second modulated information signal reproduced by said reproducing means to produce a second demodulated information signal;
  (d) first correction means for correcting time base variations of said first demodulated information signal produced by said first demodulation means;
  (e) second correction means for correcting time base variations of said second demodulated information signal produced by said second demodulation means; and
  (f) correcting action control means for controlling correcting actions of said first correction means and said second correction means on the basis of at least one of the period part of said first modulated information signal and the period part of said second modulated information signal.

11. An apparatus according to claim 10, wherein said first modulated information signal includes an angle-modulated luminance signal where the period part is a synchronizing signal part modulated to be a first frequency signal, and wherein said second modulated information signal includes an angle-modulated chrominance signal where the period part is a pedestal part modulated to be a second frequency signal.

12. An apparatus according to claim 11, wherein said first demodulation means includes first angle demodulation means arranged to angle-demodulate said angle-modulated luminance signal reproduced by said reproducing means to output a luminance signal.

13. An apparatus according to claim 12, wherein said second demodulation means includes second angle demodulation means arranged to angle-demodulate said angle-modulated chrominance signal reproduced by said reproducing means to output a chrominance signal.

14. An apparatus according to claim 13, wherein said correcting action control means includes:
  (a) first clock signal forming means for forming a first clock signal which is phase-locked with the synchronizing signal part of said angle-modulated luminance signal reproduced by said reproducing means; and
  (b) second clock signal generating means for generating a second clock signal.

15. An apparatus according to claim 14, wherein said first correction means includes first storing means for storing said luminance signal output from said first angle demodulation means, said first storing means being arranged to write said luminance signal in synchronism with said first clock signal output from said first clock signal forming means and to read said written luminance signal in synchronism with said second clock signal output from said second clock signal generating means.

16. An apparatus according to claim 14, wherein said second correction means includes second storing means for storing said chrominance signal output from said second angle demodulation means, said second storing means being arranged to write said chrominance signal in synchronism with said first clock signal output from said first clock signal forming means and to read said written chrominance signal in synchronism with said second clock signal output from said second clock signal generating means.

17. An apparatus according to claim 14, wherein said first clock signal forming means includes:
  (a) angle-modulated synchronizing signal separation means for separating an angle-modulated synchronizing signal part from said angle-modulated luminance signal reproduced by said reproducing means;
  (b) first phase error detecting means for detecting a first phase difference between said angle-modulated synchronizing signal part separated by said angle-modulated synchronizing signal separation means and said first clock signal to generate a first phase error signal according to said first phase difference;
  (c) horizontal synchronizing signal separation means for separating a horizontal synchronizing signal from said luminance signal output from said first angle demodulation means;
  (d) second phase error detecting means for detecting a second phase difference between said horizontal synchronizing signal separated by said horizontal synchronizing signal separation means and said first clock signal to generate a second phase error signal corresponding to said second phase difference; and
  (e) first clock signal generating means, arranged to receive said first phase error signal output from said first phase error detecting means and said second phase error signal output from said second phase error detecting means and to be controlled by said first and second phase error signals, for generating said first clock signal which is phase-locked with both said angle-modulated synchronizing signal and said horizontal synchronizing signal.

18. A video signal recording apparatus for recording on a recording medium a video signal including a luminance signal and two color difference signals, comprising:
  (a) first frequency modulation means, arranged to receive said luminance signal, for frequency-modulating said received luminance signal to produce a frequency-modulated luminance signal;
  (b) color-difference line-sequential conversion means, arranged to receive said two color-difference signals, for converting said received two color difference signals into a color-difference line-sequential signal to produce said color-difference line-sequential signal;
  (c) second frequency modulation means for frequency-modulating said color-difference line-sequential signal produced by said color-difference line-sequential conversion means to produce a frequency-modulated color-difference line-sequential signal;
  (d) reference frequency signal generating means for generating a first reference frequency signal and a second reference frequency signal which differs in frequency from said first reference frequency signal;

(e) first correction means for correcting a signal corresponding to a synchronizing signal period of said frequency-modulated luminance signal produced by said first frequency modulation means on the basis of said first reference frequency signal generated by said reference frequency signal generating means;

(f) second correction means for correcting a signal corresponding to a pedestal period of said frequency-modulated color-difference line-sequential signal on the basis of said second reference frequency signal generated by said reference frequency signal generating means; and (g) recording means for recording on said recording medium said frequency-modulated luminance signal corrected by said first correction means and said frequency-modulated color-difference line-sequential signal corrected by said second correction means.

19. An apparatus according to claim 18, further comprising synchronizing signal separation means, arranged to receive said luminance signal, for separating from said luminance signal a synchronizing signal part from said received luminance signal.

20. An apparatus according to claim 19, wherein said first correction means includes:

(a) first phase comparison means for comparing the phase of said frequency-modulated luminance signal produced by said first frequency modulation means with that of said first reference frequency signal produced by said reference frequency signal generating means to produce a first phase error signal indicative of the result of the comparison; and (b) first phase error signal supply means for supplying, in accordance with said synchronizing signal part separated by said synchronizing signal separation means, to said first frequency modulation means said first phase error signal produced by said first phase comparison means for a period during which said synchronizing signal part of said luminance signal is supplied to said first frequency modulation means.

21. An apparatus according to claim 20, wherein said second correction means includes:

(a) second phase comparison means, arranged to compare the phase of said frequency-modulated color-difference line-sequential signal produced by said second frequency modulation means with that of said second reference frequency signal produced by said reference frequency signal generating means to produce a second phase error signal indicative of the result of the comparison; and (b) second phase error signal supply means for supplying, in accordance with said synchronizing signal part separated by said synchronizing signal separation means, to said second frequency modulation means said second phase error signal produced by said second phase comparison means for a period during which a pedestal part of said color-difference line-sequential signal is supplied to said second frequency modulation means.

22. An apparatus according to claim 20, wherein said first frequency modulation means is arranged to frequency-modulate said input luminance signal, in accordance with said first phase error signal supplied from said first phase error signal supply means, in such a manner that said synchronizing signal part of said frequency-modulated luminance signal is phase-locked with said first reference frequency signal generated by said reference frequency signal generating means.

23. An apparatus according to claim 21, wherein said second frequency modulation means is arranged to frequency-modulate said input color-difference line-sequential signal, in accordance with said second phase error signal supplied from said second phase error signal supply means, in such a manner that said pedestal part of said frequency-modulated color-difference line-sequential signal is phase-locked with said second reference frequency signal generated by said reference frequency signal generating means.

24. An apparatus according to claim 18, wherein said recording means includes frequency multiplex means for frequency-multiplexing said frequency-modulated luminance signal corrected by said first correction means with said frequency-modulated color-difference line-sequential signal corrected by said second correction means.

25. A video signal reproducing apparatus for reproducing a frequency-modulated luminance signal and a frequency-modulated color-difference line-sequential signal from a recording medium having a record of a video signal including said luminance signal and said color-difference line-sequential signal, comprising:

(a) reproducing means for reproducing from said recording medium said frequency-modulated luminance signal in which a signal of a period corresponding to a synchronizing part is of a first frequency and said frequency-modulated color-difference line-sequential signal in which a signal of a period corresponding to a pedestal part is of a second frequency;

(b) first frequency demodulation means for frequency-demodulating said frequency-modulated luminance signal reproduced by said reproducing means to produce a luminance signal;

(c) second frequency demodulation means for frequency-demodulating said frequency-modulated color-difference line-sequential signal reproduced by said reproducing means to produce a color-difference line-sequential signal;

(d) first correction means for correcting time base variations of said luminance signal produced by said first frequency demodulation means;

(e) second correction means for correcting time base variations of said color-difference line-sequential signal produced by said second frequency demodulation means;

(f) correcting action control means for controlling correcting actions of said first correction means and said second correction means on the basis of at least one of said signal of a period corresponding to a synchronizing part of said frequency-modulated luminance signal and said signal of a period corresponding to a pedestal part of said frequency-modulated color difference line-sequential signal; and (g) simultaneous conversion means for converting said color-difference line-sequential signal whose time base variations have been corrected by said second correction means into simultaneous signals to produce two color-difference signals.

26. An apparatus according to claim 25, wherein said correcting action control means includes:

(a) first clock signal forming means for forming a first clock signal which is phase-locked with a synchronizing signal part of said frequency-modulated luminance signal reproduced by said reproducing means; and (b) second clock signal generating means for generating a second clock signal.

27. An apparatus according to claim 1, wherein said first correction means includes first storing means for storing said luminance signal produced by said first frequency demodulation means, said first storing means being arranged to write said luminance signal in synchronism with said first clock signal output from said first clock signal forming means and to read said written luminance signal in synchronism with said second clock signal output from said second clock signal generating means.

28. An apparatus according to claim 26, wherein said second correction means includes second storing means for storing said color-difference line-sequential signal produced by said second frequency demodulation means, said second storing means being arranged to write said color-difference line-sequential signal in synchronism with said first clock signal output from said first clock signal forming means and to read said written color-difference line-sequential signal in synchronism with said second clock signal output from said second clock signal generating means.

29. An apparatus according to claim 26, wherein said first clock signal forming means includes:

(a) frequency-modulated synchronizing signal separation means for separating a frequency-modulated synchronizing signal part from said frequency-modulated luminance signal reproduced by said reproducing means;

(b) first phase error detecting means for detecting a first phase difference between said frequency-modulated synchronizing signal separated by said frequency-modulated synchronizing signal separating means and said first clock signal to generate a first phase error signal corresponding to said first phase difference;

(c) horizontal synchronizing signal separation means for separating a horizontal synchronizing signal from said luminance signal produced by said first frequency demodulation means;

(d) second phase error detecting means for detecting a second phase difference between said horizontal synchronizing signal separated by said horizontal synchronizing signal separation means and said first clock signal to generate a second phase error signal corresponding to said second phase difference; and (e) first clock signal generating means, arranged to receive said first phase error signal output from said first phase error detecting means and said second phase error signal output from said second phase error detecting means and to be controlled by said first and second phase error signals, for generating said first clock signal which is phase-locked with both said frequency-modulated synchronizing signal and said horizontal synchronizing signal.

* * * * *